United States Patent [19]

Foster

[11] 4,271,658
[45] Jun. 9, 1981

[54] CLUTCH AND BLADE BRAKE FOR LAWN MOWER

[75] Inventor: Leslie W. Foster, Wayzata, Minn.

[73] Assignee: The Toro Company, Minneapolis, Minn.

[21] Appl. No.: 128,939

[22] Filed: Mar. 10, 1980

[51] Int. Cl.³ ............... A01D 69/08; A01D 69/10
[52] U.S. Cl. ............................ 56/11.3; 192/18 R
[58] Field of Search .................. 56/11.3, 11.7; 192/18 R

[56] References Cited

U.S. PATENT DOCUMENTS

| | | |
|---|---|---|
| 2,418,019 | 3/1947 | Fast ............................ 192/18 R |
| 2,440,304 | 4/1948 | Simmons ..................... 192/18 R |
| 2,891,642 | 6/1959 | Moore .......................... 192/18 R |
| 2,985,992 | 5/1961 | Dowdle ........................ 56/11.3 |
| 3,282,386 | 11/1966 | Aschauer ..................... 192/18 R |
| 4,035,994 | 7/1977 | Hoff .............................. 56/11.3 |
| 4,122,652 | 10/1978 | Holtermann ................. 56/11.3 |
| 4,205,809 | 6/1980 | Mayazawa et al. .......... 56/11.3 |
| 4,213,521 | 7/1980 | Mudershon .................. 56/11.3 |
| 4,226,313 | 10/1980 | Meldahl et al. .............. 56/11.3 |

*Primary Examiner*—Paul J. Hirsch
*Attorney, Agent, or Firm*—James W. Miller

[57] ABSTRACT

A clutch and brake apparatus (2) includes a drive member (8) and a driven member (14) axially fixed to drive member (8). An array (50) of friction discs (52 and 54) is axially movable in a clutch chamber (22) in driven member (14). Friction discs (52) continuously engage drive member (8). Springs (48) force array (50) into engagement with thrust surface (60) on driven member (14) to couple driven member (14) to drive member (8). The driving connection is broken by a movable shell (66) which engages against the lowermost friction disc (54) through pins (74) to selectively move array (50) downwardly against the force of the springs (48). Shell (66) is moved downwardly by fingers (86) which also engage against a brake pad (76) on shell (66) to stop rotation of driven member (14).

18 Claims, 2 Drawing Figures

CLUTCH AND BLADE BRAKE FOR LAWN MOWER

TECHNICAL FIELD

This invention relates primarily to lawn mowers or similar grass cutting machines. More specifically, this invention relates to a combined clutch and blade brake mechanism for the cutting element of the lawn mower. The mechanism of this invention stops rotation of the cutting element upon disengagement of the clutch.

DESCRIPTION OF THE PRIOR ART

Lawn mowers of the rigid blade type are known for cutting grass and other types of lawn cover. Such lawn mowers generally include a wheeled housing having a cutting chamber on the underside thereof. A power source, e.g. an internal combustion or electric motor, has a rotatable and vertically arranged drive shaft that extends into the cutting chamber. A rigid blade having plural cutting edges is secured to the end of the drive shaft. This blade rotates in a horizontal cutting plane and severs the grass at a height which is determined by the height of the housing above the ground.

The rigid blades which have been used in the past have often included hardened steel blades. Such a blade when rotated by the power source of the mower develops considerable momentum. While lawn mowers have been designed to minimize the chances of the operator sticking a portion of his body into contact with the blade, accidents of this type sometimes occur, either through the negligence of the operator or due to unforeseen circumstances. Needless to say, the result of such accidents is often the severing or gashing of the body member placed into contact with the cutting blade. Such injuries are, of course, detrimental to both the operator and the manufacturer of the lawn mower.

Various attempts have been made to solve the safety problem posed by rigid blades. These attempts have included the devlopment of a combined clutch and brake mechanism for the cutting blade. Such devices have been tied to a deadman's control lever on the handle of the lawn mower. If for some reason the operator should let go of the deadman's control lever, the clutch and brake mechanism will simultaneously disengage the cutting blade from the still running power source and stop rotation of the blade. Stoppage of the blade is supposed to occur sufficiently fast to ensure that the operator will not be injured.

U.S. Pat. Nos. 4,044,533 to Wick, 4,048,787 to Harkness et al and 4,058,957 to Roseberry disclose clutches and brake mechanisms for rigid blade lawn mowers. However, these mechanisms are generally open in the sense that they are not enclosed inside some type of cover. Lawn mowers are operated in "dirty" environments. Grass clippings, dust, and other debris quickly coat both the cutting chamber and also the top surface of the housing. Thus, such mechanisms are unsatisfactory since they are open and will quickly become contaminated with foreign matter rendering proper operation extremely unlikely. Such mechanisms do not have the required degree of reliability in actual use of the lawn mower.

U.S. Pat. No. 4,122,652 to Holtermann is of interest. Holtermann discloses a lawn mower blade clutch and brake in which a series of interleaved friction discs comprise the clutch elements. These friction discs are contained inside an enclosed clutch chamber so that contamination by foreign material will not be as great a problem as with the other types of devices noted above. In Holtermann, the clutch housing is axially movable relative to the drive shaft between a first position in which the friction discs drive the clutch housing to a second position in which the clutch housing is lifted out of engagement with the friction discs to be uncoupled from the drive shaft. The element that lifts the clutch housing upwardly also contains a brake pad for slowing rotation of the clutch housing.

While Holtermann is not faced with the problem of dirt contamination to the same degree as the other devices, his clutch and brake mechanism is disadvantageous since the clutch housing is axially movable relative to the shaft to effect the disengagement from the friction disks. Since the entire clutch housing, including the blade, must be moved upwardly, a relatively large amount of force is required to effect the upward movement, especially considering the gravitational force on the clutch housing and the aerodynamic force created by the spinning blade. This requires that the lifting element be engineered sufficiently strongly to accomplish this function. This adds to the expense of the lawn mower. In addition, it may also require a greater effort by the operator of the lawn mower who is after all the source of the motive force for lifting the clutch housing upwardly. Finally, since the lifting element is positioned beneath the clutch housing and operates to move it upwardly, it is more susceptible to dirt contamination which contamination is always greater on the undersurface parts of the lawn mower. The upward movement of the clutch housing also means the height of cut will vary slightly whenever the clutch is disengaged rendering a completely uniform height of cut impossible to obtain.

Another disadvantage of Holtermann relates to the placement of the biasing spring which he uses to force the clutch housing against the interleaved friction discs. This biasing spring extends between the clutch housing and a bearing on the drive shaft. Thus, a relatively large load is imposed on this bearing which is transmitted through the drive shaft to the upper main bearing of the lawn mower engine. This load is also increased whenever the clutch is disengaged because the spring is compressed further in the disengaged clutch position. Imposition of this load on the upper main bearing of the engine is disadvantageous since it increases wear and shortens life of the engine, especially considering that lawn mower engines are relatively lightly designed.

SUMMARY OF THE INVENTION

This invention relates to a combined clutch and brake mechanism for the blade of a lawn mower and to an improved lawn mower embodying the same.

An aspect of this invention relates to a combined clutch and brake mechanism in which the clutch housing is axially fixed relative to the shaft and the disengagement of the clutch elements is brought about by movement of the elements themselves. Moreover, the clutch elements are contained inside an enclosed chamber.

One aspect of this invention relates to a lawn mower which comprises a movable housing. A rotable drive member is contained on the housing. A driven member is axially fixed to the drive member. A grass cutting element is fixed to the driven member. A disengagable clutch means is provided for rotatably coupling the driven member to the drive member. This clutch means comprises a thrust surface on the driven member and an array of vertically stacked clutch members. The clutch members are axially movable relative to the drive member and the driven member. At least a first clutch member has means for engaging the drive member and the clutch members are stacked in an abutting face-to-face relationship in which the clutch members are driven by friction from the first clutch member. Biasing means are used for axially forcing the array of clutch members against the thrust surface of the driven member to couple the driven member to the drive member. Means is also provided for overcoming the force of the biasing means to remove the array of clutch members from engagement with the thrust surface and uncouple the driven member from the drive member.

BRIEF DESCRIPTION OF THE DRAWINGS

The present invention will be described in more detail hereafter, when taken in conjunction with the following drawings, in which like reference numerals will refer to like elements throughout.

DETAILED DESCRIPTION

Figure 1:
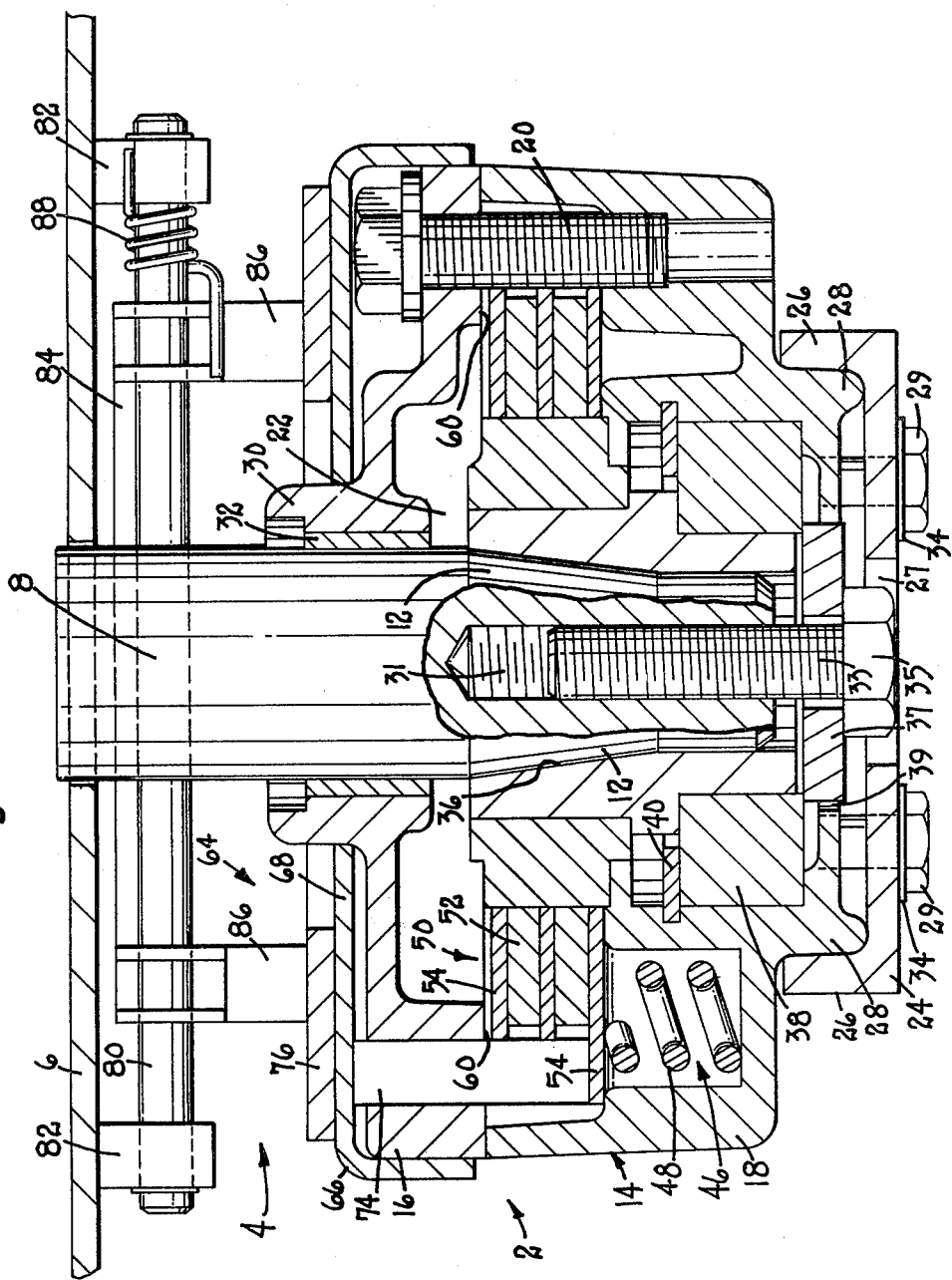
FIG. 1 is a cross-sectional view of an improved clutch and brake mechanism for the blade of a lawn mower shown in place on the drive member of the lawn mower in the clutch disengaged position.

Referring first to FIG. 1, a combination clutch and blade brake apparatus or mechanism according to this invention is generally illustrated as 2. Apparatus 2 is located in the cutting chamber 4 in the housing 6 of a rigid blade type lawn mower. Cutting chamber 4 is formed in the underside of housing 6 facing the ground. Only a portion of housing 6 is illustrated in FIG. 1. Any conventional rigid blade lawn mower could utilize apparatus 2. Those features of the lawn mower which are not important to the structure or operation of apparatus 2, such as the type of engine or power source used, the size and configuration of the cutting chamber, the shape and placement of the handle which the operator uses to guide the mower, etc., can obviously vary.

Apparatus 2 includes a rotatable drive member 8 driven by the lawn mower engine (not shown). Drive member 8 is the conventional, vertically extending drive shaft of the lawn mower engine. Drive member 8 extends downwardly from the engine through housing 6 and into cutting chamber 4. As shown in FIG. 1, drive member 8 has a reduced diameter outer end 10 connected by a tapered section 12 to the remainder of drive member 8.

Apparatus 2 includes a driven member 14. Driven member 14 comprises a cylindrical clutch housing made from cylindrical upper and lower housing members 16 and 18. A plurality of threaded securing members 20, e.g. tap bolts, releasably couple upper and lower housing members 16 and 18 together. A hollow clutch chamber 22 is defined between housing members 16 and 18 which define the upper and lower ends of clutch chamber 22 respectively.

A relatively rigid steel cutting blade 24 is releasably coupled to driven member 14. Cutting blade 24 severs the grass or other lawn cover at a predetermined height above the ground when rotated by driven member 14.

Cutting member 24 includes two opposed vertically extending retainer flanges 26 which abut against two similarly shaped flanges 28 on the bottom of lower housing member 18. A plurality of threaded securing members 29, e.g. tap bolts, pass upwardly through blade 24 and into lower housing member 18 to releasably couple blade 24 thereto. A circular aperture 27 is located in the center of blade 24 between the locations of tap bolts 29.

Upper housing member 16 includes an upwardly extending cylindrical sleeve 30 having a cylindrical bearing 32. Sleeve 30 and bearing 32 rotatably journal drive member 8. A cylindrical retainer member 34 having a conically tapered section 36 is provided inside clutch chamber 22. The conically tapered section 36 is configured to be force-fit onto the tapered section 12 of drive member 8. Retainer member 34 is rotatably journaled in lower housing member 18 by a cylindrical bushing or bearing 38, e.g. a ball bearing. Bearing 38 is retained in place in lower housing member 18 by a circular snap ring 40. The outer end 10 and tapered section 12 of drive member 8 include a threaded cylindrical bore 31. Bore 31 threadedly receives a bolt 33 having an enlarged head 35 received in aperture 27 in blade 24. A washer 37 is interposed between bolt head 35 and bearing 38 with the washer 37 being located in an aperture 39 in lower housing member 18. Thus, driven member 14 is axially fixed to drive member 8 by bolt 33 and washer 37.

Retainer member 34 also includes an output gear 42 integrally fixed or mounted thereon having a plurality of gear teeth 44. Instead of a separate toothed output gear 42 fixed thereto, the exterior surface of retainer member 34 could simply be provided with a plurality of integrally formed gear teeth 44. In addition, lower housing member 18 includes three circular recesses 46. Recesses 46 are circumferentially spaced at equal distances around lower housing member 18. An upward biasing means comprising at least one compression spring 48 is received in each recess 46. See FIG. 2.

Figure 2:
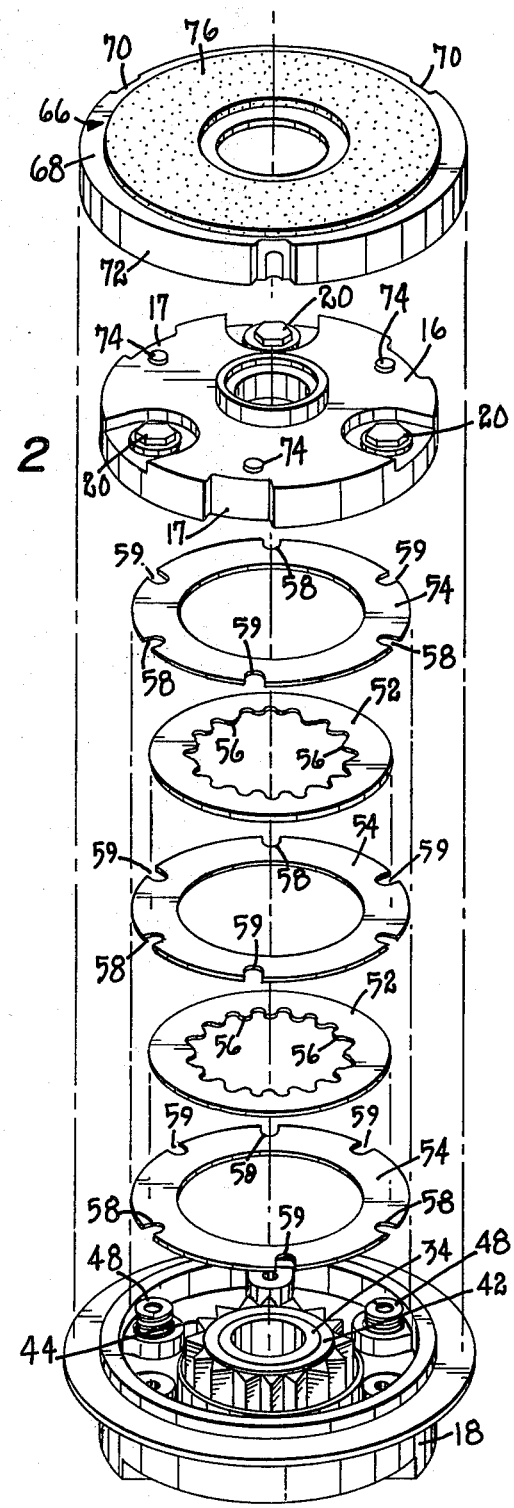
FIG. 2 is a perspective view of the clutch and brake mechanism of FIG. 1, with the parts thereof being shown in exploded form to illustrate the manner in which they are assembled together.

Apparatus 2 further includes a disengagable clutch means for rotatably coupling driven member 14 to the continuously rotating drive member 8. Referring both to FIGS. 1 and 2, this clutch means comprises an array 50 of vertically stacked clutch members which are placed in an abutting face-to-face relationship. The clutch members comprise a first set of friction discs 52 and a second set of friction discs or separator plates 54. Friction discs 54 are interspersed or interleaved with discs 52 to form the vertically stacked array 50. All of the friction discs 52 or 54 are in the form of circular annular rings. See FIG. 2. Friction discs 52 and 54 are located inside clutch chamber 22 concentrically surrounding drive member 8 and retainer member 34. See FIG. 1.

Each friction disc 52 carries a plurality of inwardly extending gear teeth 56 on its inner diameter. Teeth 56 mesh or mate with teeth 44 of output gear 42. This toothed engagement forms a means for coupling each friction disc 52 to drive member 8 such that discs 52 are continuously rotated thereby. The remaining friction discs 54 are preferably identically shaped and include two sets of notches 58 or 59 around the outer diameter thereof. Notches 58 provide clearance for tap bolts 20. Notches 59 have a purpose which will be described hereafter. While notches 58 and 59 are equally spaced relative to each other (at 120° intervals), the notches 59 are not equally spaced between the notches 58. The distance A in FIG. 2 is greater than the distance B. The lowermost friction disc 54 need not include notches 59 and therefore may be formed differently from the other friction discs.

The disengagement clutch means also includes a thrust surface 60 on driven member 14. Thrust surface 60 comprises an annular portion or section of upper housing member 16. Biasing springs 48 engage against the lowermost friction disc 54 in the array 50 to exert an upward biasing force thereon. Springs 48 are sufficiently strong to force the array 50 of clutch members upwardly until the uppermost friction disc 54 is engaged against thrust surface 60. In this condition, driven member 14 will be coupled to drive member 8.

A means 64 is provided for overcoming the force of springs 48 to move the array 50 of clutch members downwardly away from thrust surface 60. This overcoming means 64 includes a cylindrical shell 66 having a horizontal surface 68 closing one end thereof. Shell 66 concentrically surrounds the upper housing member 16 and is provided with three circumferentially spaced indents 70 on the vertical wall 72 of shell 66. Indents 70 key shell 66 to corresponding indents 17 in the sides of upper housing member 16 to retain shell 66 thereon and rotatably couple shell 66 to driven member 14. However, indents 70 also allow shell 66 to be vertically slidable on the driven member 14 so that horizontal surface 68 can be moved towards or away from upper housing member 16.

In addition, overcoming means 64 includes three circumferentially spaced and vertically movable pins 74. Pins 74 extend between horizontal surface 68 of shell 66 and the lowermost friction disc 54 in the array 50 of clutch members. Pins 74 have their upper ends directly engaged against surface 68 and their lower ends directly engaged against the lowermost friction disc 54. Pins 74 are able to pass through the other friction discs 54 by being aligned with notches 59. However, the notches 59 in the lowermost friction disc 54 are not aligned with the pins (e.g., by turning lowermost friction disc 54 upside down compared to the other discs 54) so that pins 74 bear against a solid portion of the lowermost friction disc 54. See FIG. 1. In addition, shell 66 comprises an annular, frictional brake pad 76 on the upper surface thereof. Brake pad 76 may be made of any suitable brake materials.

The underside of housing 6 of the lawn mower includes a rotatable shaft 80 mounted in bearings 82. A yoke 84 having two downwardly depending fingers 86 is rotatably mounted on shaft 80. Yoke 84 may be rotated such that the fingers 86 may be brought into and out of engagement with brake pad 76. A spring 88 normally biases yoke 84 into a position where fingers 86 engage brake pad 76. In such a position, shell 66 is forced downwardly to cause the array 50 of clutch members to be removed from engagement with thrust surface 60 through the downward movement of pins 74. See FIG. 1.

In the operation of a lawn mower embodying apparatus 2, a deadman's lever (not shown) will be used on the handle of the mower. The deadman's lever is connected to yoke 84 such that whenever the operator grips the lever when operating the mower rotatable yoke 84 will be rotated upwardly until fingers 86 disengage shell 66. When this occurs, the biasing springs 48 axially move the array 50 of clutch members upwardly until the uppermost friction disc engages against thrust surface 60. All the friction discs 52 and 54 are compacted into a tight array with friction discs 52 being continuously driven by drive member 8. In this condition, the drive from friction discs 52 will be transmitted by friction through the entire array 50 to thrust surface 60 and thus to driven member 14. Thus, driven member 14 will be coupled to drive member 8 as long as fingers 86 are disengaged from shell 66.

Assuming, however, that the operator releases the deadman's lever, the biasing of spring 88 on shaft 80 will rotate the yoke 84 downwardly until the fingers 86 engage shell 66 and press shell 66 downwardly toward upper housing member 16. The downward movement of shell 66 causes the pins 74 to act on the lowermost friction disc 54 and move the entire array 50 of clutch members away from thrust surface 60. Thus, the driving connection between drive member 8 and driven member 14 is broken. Moreover, the frictional coaction between fingers 86 of yoke 84 and the brake pad 76 on shell 66 will further serve to stop rotation of the driven member 14 within a short time period. Thus, the same movement of the rotatable yoke 84 both disengages the clutch means and brakes rotation of the rigid cutting blade 24 of the mower.

The clutch and brake apparatus 2 of this invention is advantageous since it minimizes the possibility of accidental injury should the operator fall and release the deadman's control lever. As soon as the control lever is released, apparatus 2 both declutches the spinning blade 24 and also brakes the spinning blade. This is done sufficiently quickly that the likelihood of injury to the operator is minimized. Moreover, this action is accomplished simply by axially shifting the clutch elements themselves, rather than by physically moving parts of the clutch housing. Thus, the effort required by the operator to actuate apparatus 2 is considerably reduced rendering the apparatus easier to use.

In addition, because the clutch housing is axially fixed to drive member 8, the height of the cutting blade 24 will not change during clutch operation ensuring a constant height of cut. Moreover, biasing springs 48 extend between the lower housing member 18 and the clutch members to force those clutch members against a thrust surface 60 contained on upper housing member 16. Thus, the biasing forces exerted by springs 48 are contained wholly inside the clutch housing. These forces are not transmitted to the drive shaft or to any of the bearings in the lawn mower engine, thereby imposing no additional load on these components. Accordingly, apparatus 2 of this invention exerts less wear and tear on engine components as those prior art devices where biasing forces are transmitted to engine bearings.

Various modifications of this invention will be apparent to those skilled in the art. For example, biasing springs 48 could be replaced by a series of concentrically arranged springs if so desired located in each of the recesses 46. In addition, apparatus 2 is not limited solely for use with a conventional lawn mower, but could be used with any device having a spinning blade which must be clutched and braked. For example, apparatus 2 could be used with a lawn trimmer or the like if the lawn trimmer utilizes a relatively rigid blade. Thus, the scope of this invention is to be limited only by the appended claims.

What is claimed is:

1. A lawn mower, which comprises:
 (a) a movable housing;
 (b) a rotatable drive member on the housing;
 (c) a driven member;

(d) means for axially securing the driven member to the drive member;

(e) a vegetation cutting element fixed to the driven member;

(f) disengageable clutch means for rotatably coupling the driven member to the drive member, wherein the clutch means comprises:

(i) a thrust surface on the driven member;

(ii) an array of vertically stacked clutch members which are axially movable relative to the drive member and the driven member, wherein at least a first clutch member has means for engaging the drive member to be rotated thereby, and wherein the clutch members are stacked in an abutting face-to-face relationship in which the clutch members are driven by friction from the first clutch member;

(iii) biasing means for axially forcing the array of clutch members against the thrust surface of the driven member to couple the driven member to the drive member; and (iv) means for overcoming the force of the biasing means to remove the array of clutch members from engagement with the thrust surface and uncouple the driven member from the drive member.

2. A lawn mower as recited in claim 2, wherein the driven member rotatably journals the drive member and includes a substantially annular clutch chamber surrounding the drive member, and wherein the clutch members are contained inside the clutch chamber.

3. A lawn mower as recited in claim 2, wherein the clutch members comprise annular clutch rings that surround the drive member, wherein at least a portion of the drive member in the clutch chamber is toothed, and wherein the clutch ring that defines the first clutch member is provided with matching teeth to form the means of engagement with the drive member.

4. A lawn mower as recited in claim 2, wherein the clutch chamber has upper and lower ends with the thrust surface comprising an annular portion of the upper end of the clutch chamber, and wherein the biasing means extends between the lower end of the clutch chamber and a lowermost clutch member to force the array of clutch members upwardly towards the thrust surface.

5. A lawn mower as recited in claim 4, wherein the biasing means comprises a plurality of compression springs which are circumferentially spaced in the clutch chamber to provide an even upward biasing force on the lowermost clutch member.

6. A lawn mower as recited in claim 4, wherein the overcoming means comprises:

(a) at least one pin extending through the upper end of the clutch chamber and bearing against the lowermost clutch member; and (b) selectively operable means for moving the pin downwardly against the force of the biasing means to displace the lowermost clutch member downwardly and remove the array of clutch members from engagement with the thrust surface.

7. A lawn mower as recited in claim 6, further including a plurality of circumferentially spaced pins extending through the upper end of the clutch chamber with each pin bearing against the lowermost clutch member, and wherein the selectively operable moving means acts on all the pins simultaneously.

8. A lawn mower as recited in claims 6 or 7, wherein the selectively operable moving means comprises:

(a) a substantially horizontal surface rotatably fixed to the driven member which engages against the upper end of each pin, wherein the surface is axially movable towards the upper end of the clutch chamber to displace all the pins simultaneously; and (b) means on the housing which may be selectively moved into engagement with the surface to move the surface towards the upper end of the clutch chamber.

9. A lawn mower as recited in claim 8, wherein the means on the housing comprises a rotatable yoke having two downwardly depending fingers which may be rotated into and out of engagement with the surface.

10. A lawn mower as recited in claim 8, wherein the surface has a frictional brake pad that coacts with the means on the housing for stopping rotation of the driven member.

11. A lawn mower as recited in claim 8, wherein the surface is part of an annular shell that encircles the upper end of the clutch chamber, wherein the shell has circumferentially spaced indents which are keyed to the upper end of the clutch chamber to retain the shell thereon but which are shaped to allow the shell to vertically slide on the upper end of the clutch chamber to render the shell axially movable.

12. A lawn mower as recited in claim 1, further including means for braking rotation of the driven member simultaneously with actuation of the overcoming means.

13. A combined clutch and brake mechanism for relatively rigid members, which comprises:

(a) a rotatable drive member having a toothed output gear fixed thereto for rotation therewith;

(b) a clutch housing axially fixed to the drive member, wherein the clutch housing has a substantially enclosed clutch chamber which concentrically surrounds and in which the output gear of the drive member is located, wherein the clutch housing includes means for mounting the relatively rigid member thereon;

(c) clutch means for operatively coupling the clutch housing to the drive member for rotation therewith, wherein the clutch means comprises:

(i) a first set of spaced friction discs located in the clutch chamber which are toothed to cooperate with the output gear such that the first set of friction discs is continuously rotated thereby;

(ii) a second set of spaced friction discs in the clutch chamber interleaved with the first set with a bottom one of the second set of friction discs being located beneath the first set of friction discs; and (iii) means engaging against the bottom one of the second set of friction discs for biasing the first and second sets of friction discs against an end wall of the clutch chamber until the first and second sets of friction discs are tightly compacted thereby establishing a driving connection between the drive member and the clutch housing through the first and second sets of friction discs;

(d) means for moving the first and second sets of friction discs axially relative to the drive member until the friction discs disengage the end wall of the clutch housing and the driving connection with the clutch housing is broken; and (e) means for braking rotation of the clutch housing substantially simultaneously with movement of the friction discs away from the end wall of the clutch housing.

14. A combined clutch and blade brake mechanism as recited in claim 13, wherein the means for moving the first and second sets of friction discs away from the end wall comprises a shell supported on the clutch housing and axially movable relative thereto, and further including a plurality of pins bearing against the bottom one of the second set of friction discs and extending outwardly through the clutch housing and engagable against the shell, wherein the pins move the bottom one of the second set of friction discs away from the end wall when the shell is moved towards the housing.

15. A combined clutch and blade brake mechanism as recited in claim 14, further including means for moving the shell towards the clutch housing.

16. A combined clutch and blade brake mechanism as recited in claim 15, wherein the means for moving the shell towards the clutch housing comprises a member which is selectively rotatable downwardly into engagement with a top surface of the shell to force the shell towards the clutch housing.

17. A combined clutch and blade brake mechanism as recited in claim 16, wherein the top surface of the shell includes a frictional brake pad, and wherein the brake pad is cooperable with the rotatable member for stopping rotation of the clutch housing.

18. A clutch mechanism, which comprises:
(a) a rotatable drive member;
(b) a driven member; and
(c) disengageable clutch means for rotatably coupling the driven member to the drive member, wherein the clutch means comprises:
  (i) a thrust surface on the driven member;
  (ii) an array of stacked clutch members which are axially movable relative to the drive member and the driven member, wherein at least a first clutch member has means for engaging the drive member to be rotated thereby, and wherein the clutch members are stacked in an abutting face-to-face relationship in which the clutch members are driven by friction from the first clutch member;
  (iii) biasing means for axially forcing the array of clutch members against the thrust surface of the driven member to couple the driven member to the drive member, wherein the biasing means extends between the array of clutch members and a portion of the driven member generally opposite to the thrust surface such that the force of the biasing means is contained in the driven member; and
  (iv) means for overcoming the force of the biasing means to remove the array of clutch members from engagement with the thrust surface and uncouple the driven member from the drive member.

* * * * *